United States Patent
Tayhan

(10) Patent No.: US 10,820,573 B2
(45) Date of Patent: Nov. 3, 2020

(54) PET BRUSH SYSTEM

(71) Applicant: Serdar Tayhan, Philadelphia, PA (US)

(72) Inventor: Serdar Tayhan, Philadelphia, PA (US)

(*) Notice: Subject to any disclaimer, the term of this patent is extended or adjusted under 35 U.S.C. 154(b) by 211 days.

(21) Appl. No.: 16/003,100

(22) Filed: Jun. 7, 2018

(65) Prior Publication Data

US 2019/0373855 A1    Dec. 12, 2019

(51) Int. Cl.
*A01K 13/00* (2006.01)
*A46B 15/00* (2006.01)

(52) U.S. Cl.
CPC .......... *A01K 13/00* (2013.01); *A46B 15/0046* (2013.01); *A46B 2200/1093* (2013.01)

(58) Field of Classification Search
CPC .... A01K 13/00; A01K 13/001; A01K 13/002; A46B 15/0046; A46B 2200/1093
See application file for complete search history.

(56) References Cited

U.S. PATENT DOCUMENTS

| | | | | |
|---|---|---|---|---|
| 8,342,187 | B2* | 1/2013 | Kalman | A61H 7/005 |
| | | | | 132/119.1 |
| 8,505,492 | B2* | 8/2013 | Werner | A01K 13/002 |
| | | | | 119/609 |
| 2007/0068546 | A1* | 3/2007 | Lipawsky | A01K 13/002 |
| | | | | 132/119.1 |
| 2007/0180637 | A1* | 8/2007 | McKay | A01K 13/002 |
| | | | | 15/22.1 |
| 2013/0330239 | A1* | 12/2013 | Cohen | A01K 13/002 |
| | | | | 422/128 |

* cited by examiner

*Primary Examiner* — Trinh T Nguyen
(74) *Attorney, Agent, or Firm* — Jerry D Haynes; Law Office of Jerry D Haynes

(57) ABSTRACT

A pet brush system that includes a brush with a set of vibrating bristles at an application end of the brush. A handle extends from the set of vibrating bristles with a power connection at a distal end of the handle. A battery is included within the handle for power. The system further includes a power cord adapted to connect to the power connection to supply power to the brush.

3 Claims, 1 Drawing Sheet

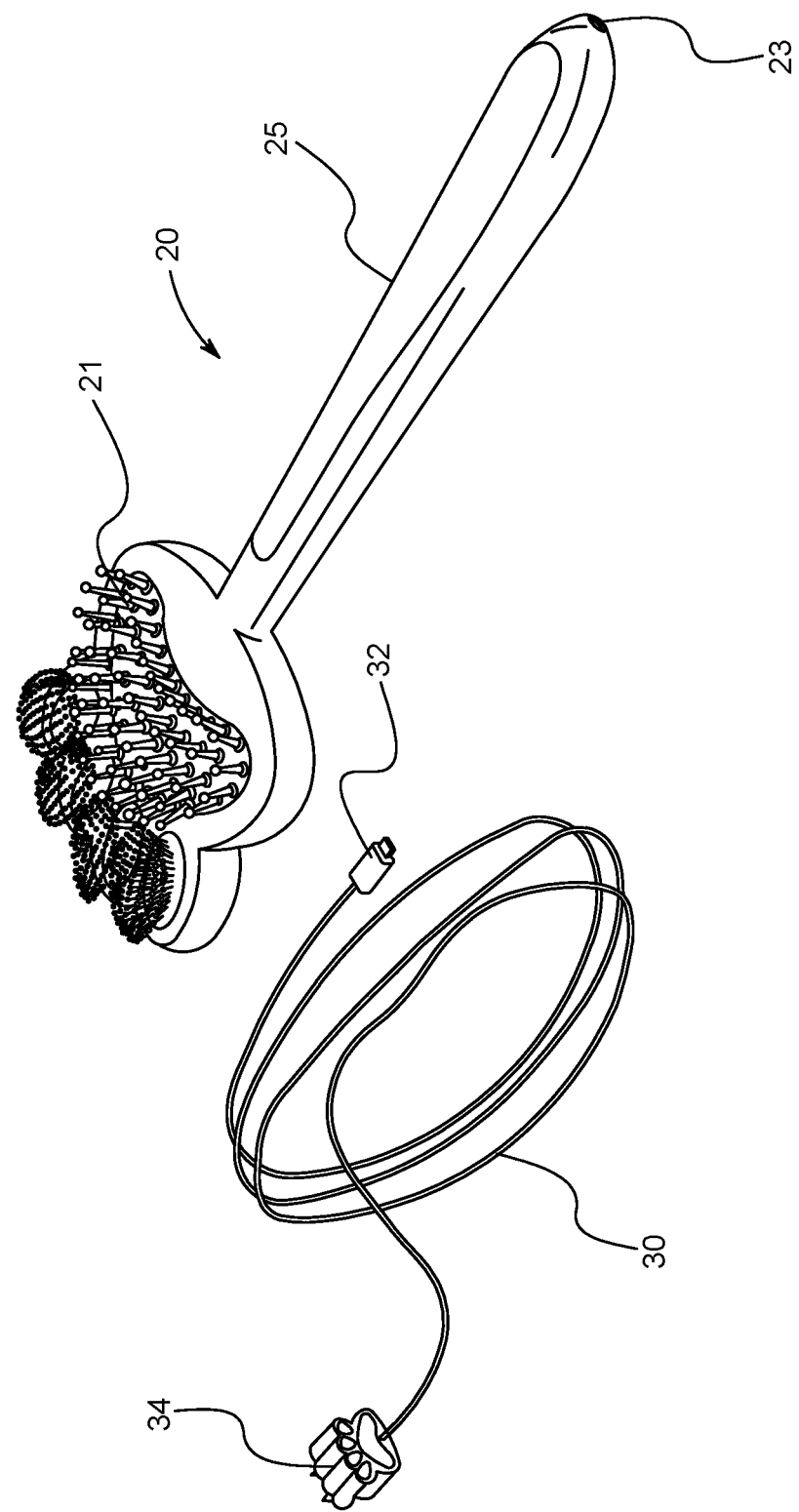

PET BRUSH SYSTEM

BACKGROUND OF THE INVENTION

Field of Invention

The present invention relates a pet brush system with a set of vibrating bristles for application on a pet.

Description of Related Art

Pet care involves various types of maintenance for related to hygiene for the upkeep and enjoyment of a household pet. Typical household pets include cats, dogs or other furry animals depending on the taste of the individual pet owner. A pet's fur typically requires some washing, shampooing, brushing and/or combing to maintain the pet's fur. Brushing ensures that the pet doesn't suffer from the accumulation of fleas or ticks in their fur. Brushing generally helps to keep the fur clean. Grooming pets is usually a manual process and brushing pets can serve as massage therapy. The massage therapy may serve as an additional benefit for the pet during the grooming process. The object of the present invention is to provide an electrical vibrating pet brush that enhances the massaging therapy that's usually associated with brushing of a pet's fur.

SUMMARY OF THE INVENTION

The present invention relates to a pet brush system that includes a brush with a set of vibrating bristles at an application end of the brush. A handle extends from the set of vibrating bristles with a power connection at a distal end of the handle. A battery is included within the handle for power. The system further includes a power cord adapted to connect to the power connection to supply power to the brush.

BRIEF DESCRIPTION OF DRAWINGS

FIG. 1 depicts a pet brush system according to the present invention.

DETAILED DESCRIPTION

The present invention relates to a pet brush system and includes a brush with vibrating bristles that are powered through a battery within the brush. A power cord is provided to connect to the brush handle to supply power for charging the pet brush after use. Further, the pet brush may be used while connected to the power cord which connects to a typical AC outlet.

The pet brush system is depicted in FIG. 1 and includes pet brush 20. In this embodiment the pet brush 20 is shaped to resemble a pet paw. The pet brush 20 includes a set of vibrating bristles 21 as an application end of the brush 20. In this embodiment, the bristles include two distinct bristle arrangements, a first bristle arrangement 22 and a second bristle arrangement 24. The first bristle arrangement 22 includes a first density of bristles, where the first bristle arrangement 22 has a first length. The second bristle arrangement 24 includes four distinct pads, where the second bristle arrangement 24 includes a second density of bristles. The second bristle arrangement 24 also includes a second length. In one embodiment, the second density of bristles is greater than the first density of bristles. Further the first length of bristles is longer that the second length of bristles. In one particular embodiment, the vibrating bristles may vibrate at least two speeds and the speed vibration may vary. Further, the first bristle arrangement 22 may vibrate at a first speed and the second bristle arrangement vibrate at a second speed. Extending from the set of vibrating bristles 21 is a handle 25. This handle 25 includes a power supply, not shown, to energize the vibrating bristles 21 at the application point.

Power to generate the vibrating bristles is preferably supplied by battery, not shown within the handle 25 of the pet brush 20. A power cord 30 includes a connector 32, which connects to a power connection 23 provided at the distal end of the pet brush handle 25. The power cord 30 also includes a plug 34 that connects in the AC power outlet for charging purposes. Use of this vibrating pet brush provides soothing massage therapy for any pet. The brush 20 may be used connected to power cord 30 or if adequately charged independently based on the stored battery power within the handle 25.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A pet brush system comprising:
   a. a brush;
   b. a set of vibrating bristles at an application end of the brush, includes a first bristle arrangement and a second bristle arrangement, wherein the first bristle arrangement includes a first density of bristles and the first bristle arrangement has a first length, and wherein the second bristle arrangement includes four distinct pads, where the second bristle arrangement includes a second density of bristles, and the second bristle arrangement includes a second length, wherein the second density is greater than the first density and said first length is greater than the second length;
   c. a handle extending from the set of vibrating bristles;
   d. a power connection at a distal end of the handle;
   e. a battery within the handle; and
   f. a power cord adapted to connect to the power connection to supply power to the brush.

2. The pet brush system according to claim 1, where the vibrating bristles vibrate at least two speeds.

3. The pet brush system according to claim 1, where the brush is shaped as pet paw.

* * * * *